US008010790B2

(12) United States Patent
Lee et al.

(10) Patent No.: US 8,010,790 B2
(45) Date of Patent: *Aug. 30, 2011

(54) BLOCK-LEVEL STORAGE DEVICE WITH CONTENT SECURITY

(75) Inventors: Lane W. Lee, Boulder, CO (US); Randal C. Hines, Boulder, CO (US); Mark J. Gurkowski, Longmont, CO (US); David L. Blankenbeckler, Longmont, CO (US)

(73) Assignee: DPHI, Inc., Longmont, CO (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/207,684

(22) Filed: Sep. 10, 2008

(65) Prior Publication Data

US 2009/0003608 A1    Jan. 1, 2009

Related U.S. Application Data

(62) Division of application No. 10/696,077, filed on Oct. 28, 2003, now Pat. No. 7,549,044.

(51) Int. Cl.
*H04L 9/00* (2006.01)

(52) U.S. Cl. ............ 713/167; 713/193; 726/26; 726/27; 726/28; 726/29; 726/31; 726/33; 380/201; 380/202; 380/203; 380/204; 380/264

(58) Field of Classification Search ........................ None
See application file for complete search history.

(56) References Cited

U.S. PATENT DOCUMENTS

| | | | |
|---|---|---|---|
| 6,636,966 B1 * | 10/2003 | Lee et al. | 713/165 |
| 6,820,203 B1 * | 11/2004 | Okaue et al. | 713/193 |
| 6,912,514 B2 * | 6/2005 | Matsushima et al. | 705/52 |
| 7,110,982 B2 * | 9/2006 | Feldman et al. | 705/51 |
| 7,310,821 B2 * | 12/2007 | Lee et al. | 726/27 |
| 7,549,044 B2 * | 6/2009 | Lee et al. | 713/167 |
| 7,636,843 B1 * | 12/2009 | Asano et al. | 713/169 |
| 7,672,903 B2 * | 3/2010 | Lee et al. | 705/51 |
| 7,729,495 B2 * | 6/2010 | Lee et al. | 380/203 |

OTHER PUBLICATIONS

FIPS Pub 46-3 "Data Encryption Standard (DES)" Oct. 25, 1999.*
Menezes et al. Handbook of Applied Cryptography, CRC Press, 1997, Section 8.4 "Elgamal public key encryption" and Section 12.5 "Key transport based on pubic-key encryption".*

* cited by examiner

*Primary Examiner* — Kaveh Abrishamkar
(74) *Attorney, Agent, or Firm* — Haynes & Boone, LLP.

(57) ABSTRACT

A block-level storage device is provided that implements a digital rights management (DRM) system. In response to receiving a public key from an associated host system, the storage device challenges the host system to prove it has the corresponding private key to establish trust. This trust is established by encrypting a secure session key using the public key. The host system uses its private key to recover the secure session key. The storage device may store content that has been encrypted according to a content key. In addition, the storage device may encrypt the content key using the secure session key.

15 Claims, 6 Drawing Sheets

BLOCK-LEVEL STORAGE DEVICE WITH CONTENT SECURITY

CROSS REFERENCE TO RELATED APPLICATION

This application is a Divisional of U.S. patent application Ser. No. 10/696,077, filed Oct. 28, 2003, now U.S. Pat. No. 7,549,044 the contents of which are incorporated by reference in its entirety

TECHNICAL FIELD

The present invention relates generally to data storage devices. More particularly, the present invention relates to a block-level storage device that implements a digital rights management (DRM) system.

BACKGROUND

The proliferation of peer-to-peer file sharing services on the Internet has exacerbated the conflict between digital content providers and digital content users. Having possession of digital content, a consumer will often act as if he or she has full rights to this digital content. However, the content provider often retains copyright protection over the digital content that is violated by certain actions of the consumer—for example, when the consumer allows unauthorized third parties to freely copy this digital content via a file sharing program.

To address this inherent conflict between consumers and providers of digital content, a variety of Digital Rights Management (DRM) systems have been implemented. For example, a commonplace scenario involves a user on a host system such as a personal computer surfing the Internet for digital content. Upon receipt of digital content, the host system must have some type of storage engine such as a hard disk drive to store the content on a storage medium (for example, a magnetic storage hard disk). A typical location for a DRM system in such an environment is in the operating system of the host. But this location is inherently vulnerable to "hacking" by a user bent upon violating the copyright holder/content provider's rights. Thus, there has been a need in the art for DRM systems that provide greater security for content providers. At the same time, however, a DRM system should not impact the legitimate expectations of consumers in regard to fair use of the digital content.

To address the need in the art for a DRM system that meets both consumers and content providers expectations, U.S. patent application Ser. No. 09/542,510, entitled "Digital Rights Management Within an Embedded Storage Device," filed Apr. 3, 2000, now U.S. Pat. No. 6,636,966, U.S. patent application Ser. No. 09/583,452, entitled "Method of Decrypting Data Stored on a Storage Device Using an Embedded Encryption/Decryption Means," filed May 31, 2000, U.S. patent application Ser. No. 09/940,026, entitled "Host Certification Method and System," filed Aug. 27, 2001, U.S. patent application Ser. No. 09/940,083, entitled "A Secure Access Method and System," filed Aug. 27, 2001, now U.S. Pat. No. 7,110,982, describe a DRM system in which the DRM "intelligence" has been integrated into the storage engine. As opposed to conventional DRM systems that reside on the host, the integrated storage engine approach is far less vulnerable to hacking by a user of a host system—the user has no access to the DRM functionality within the storage engine other than through the reading or writing of secure content from the storage medium associated with the storage engine. The user knows that digital content may flow to and from the data storage medium but cannot access the "how" within the storage engine that enabled such movement. Moreover, the integration of the DRM system into the storage engine is advantageous in portable applications. Different host systems such as kiosks at a content provider retail outlet or a personal computer may be more readily modified to couple to the portable DRM-system-integrated storage engine.

Despite the advances described above with respect to DRM-system-integrated storage engines, there remains a need in the art for improvements in the DRM field with respect to block-level storage devices.

SUMMARY

In accordance with one aspect of the invention, a block-level storage device includes a storage medium and a storage engine. The storage engine is configured to generate a secure session key using a host system's public key, encrypt the secure session key using the public key, and transmit the encrypted secure session key to the host system. The storage engine is further configured to receive a block of encrypted content and its corresponding encrypted content key from a host system, wherein the content key has been encrypted by the host system using the secure session key. In addition, the storage engine is further configured to decrypt the encrypted content key using the secure session key and to encrypt the decrypted content key with a first storage engine encryption key and to write the storage-engine-encrypted content key to the storage medium.

In accordance with another aspect of the invention, a method is provided for writing to a block-level storage device from a host system having a public key and a corresponding private key. The method includes the acts of encrypting a secure session key using the public key; recovering the secure session key from the encrypted secure session key using the corresponding private key; encrypting content according to a content key and commanding the block-level storage device to write the encrypted content to host-system-determined block addresses; encrypting the content key using the secure session key and transmitting the encrypted content key to the block-level storage device; and in the block-level storage device, decrypting the encrypted content key using the secure session key.

In accordance with another aspect of the invention, a system includes a host system and a storage device. The host system is configured to request for file system objects stored by the storage device by identifying the block addresses containing a requested file system object and requesting the storage device to return the content stored at the identified block addresses, the host system being further configured to identify the file system object to the storage device if the requested file system object comprises secure content. The storage device includes a storage medium configured to store security metadata for the secure file system objects; and a storage engine, the storage engine being configured to respond to block-level requests from the host system by retrieving the content stored at the requested block addresses from the storage medium, the storage engine being further configured to access the security metadata if the block-level requests correspond to content comprising a secure file system object.

In accordance with another aspect of the invention, a system includes a host system and a storage device. The host system is configured to request for non-secure file system objects by identifying the block addresses corresponding to the non-secure file system object and to request for secure file system objects by identifying the file system object. The storage device include a storage medium configured to store security metadata for the secure file system objects; and a storage engine, the storage engine being configured to respond to block-level requests from the host system by retrieving the content stored at the requested block addresses from the storage medium, the storage engine being further configured to control the file system associated with secure file system objects by determining where secure file system objects will be stored on the storage medium and where the corresponding security metadata will be stored on the storage medium.

This and other aspects of the invention will become more apparent from the following drawings and description.

DETAILED DESCRIPTION

Figure 1:
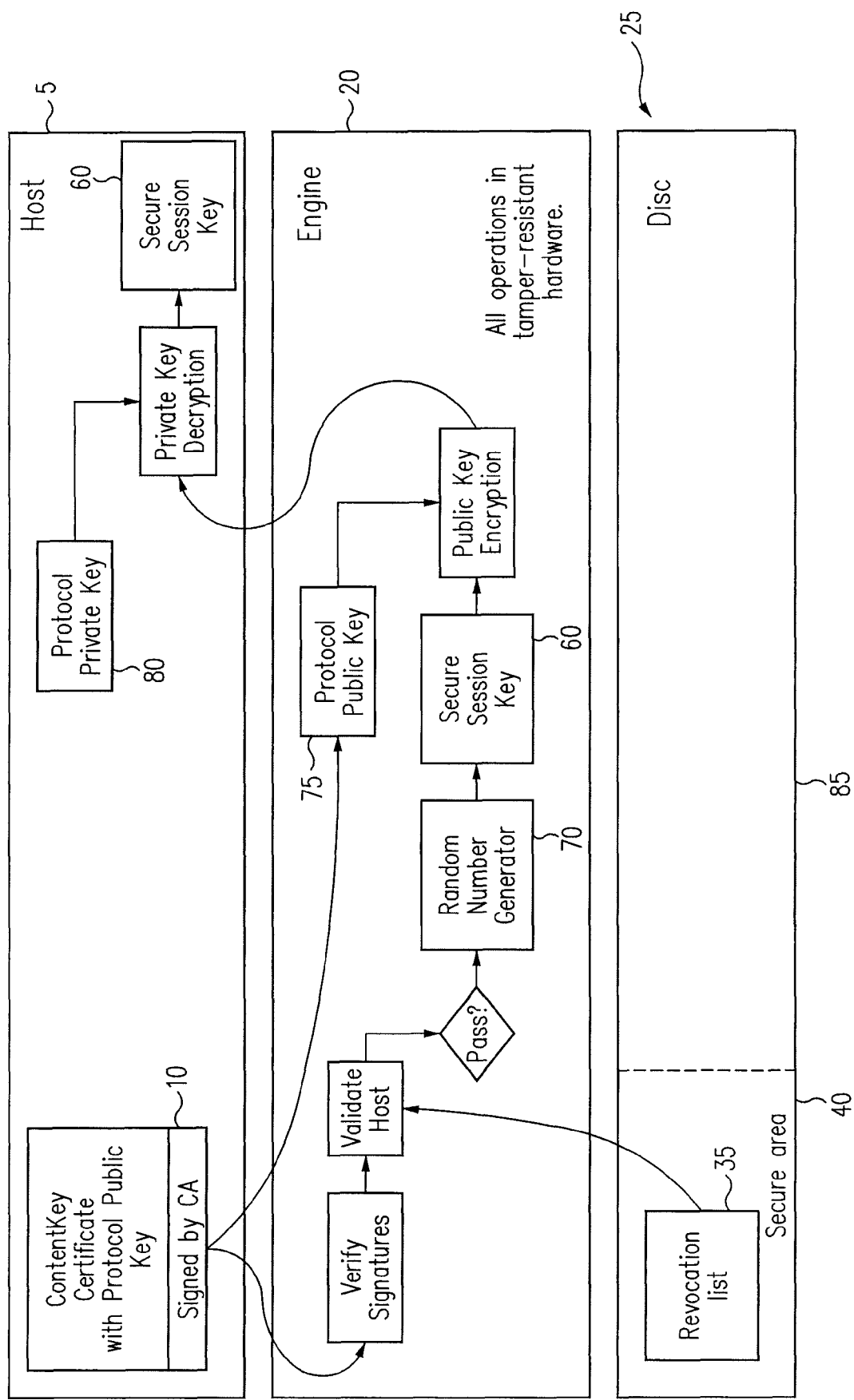
FIG. 1 is a block diagram for a host system and an associated block-level data storage device that illustrates a host authentication and verification process according to one embodiment of the invention.

The present invention provides a digital rights management (DRM) system for block-level data storage engines. Many conventional data storage engines are block-level devices such as hard disk drives, floppy drives, CD-ROM drives, and DVD drives. A block is a group of digital data that is written or read as a group. Host systems that interface with a block-level storage device must translate a file request (e.g., a request for "Myfile.txt") to the actual physical addresses for the corresponding blocks of data on the storage medium. The storage engine receives the block-level request and retrieves the corresponding blocks of data from the storage medium.

It follows that a block-level storage device is relatively "dumb" in that it merely responds to block-level data requests without having any knowledge of the corresponding file structure. In the present invention, however, the storage engine is provided with intelligence to perform digital rights management with respect to secured content on the accompanying storage medium. Moreover, in certain embodiments of the present invention, the storage engine will possess knowledge of the corresponding file structure used by the host.

Regardless of the level of intelligence possessed by the storage engine, certain functionalities will be common for all embodiments of the storage engine. For example, before a host system can read protected content from or write protected content to a storage engine, the host must prove itself as authentic to the storage engine and vice versa. After being authenticated, each device will be in possession of a "session key" which authorizes the exchange of protected content between the devices. In other words, the host must establish that it is a "trusted" device or application to the storage engine. Similarly, the storage engine must establish trust with the host system. To be authorized to access secured digital content, each device (the host system and the storage engine) must receive access permission from a certifying authority.

This authentication process involves the use of public key cryptography. As is known in the cryptography arts, public key cryptography involves the use of public key/private key pairs. These key pairs are used to asymmetrically encrypt and decrypt messages. Each participant in the authentication process may freely let other participants know its public key. However, the private key for each participant is, as implied by the name, never disclosed to the other participants. The public keys are used for encryption whereas the private keys are used for decryption. A number of public key algorithms are known, however, the present invention is preferably implemented using public key algorithms possessing a reflexive property. These reflexive public key algorithms include RSA (Rivest, Shamir, and Adelman) as well as ECC (elliptic curve cryptography). In a reflexive public key algorithm, if a message is encrypted using the public key and then decrypted using the corresponding private key or if the same message is decrypted using the private key and then encrypted using the public key, the same result is achieved, namely recovery of the message.

To generate a digital signature, a participant decrypts a message using its private key. Because this private key is never revealed to other participants, the digital signature will be unique to the signing participant. Other participants may receive both the message and the digital signature. By processing (encrypting) the digital signature with the corresponding public key, these other participants will produce the message. After verifying that the produced message is the same as the message received with the digital signature, these other participants may be assured that the digital signature is genuine. Note that because the digital signature is produced with a private key, the digital signature will be unique to the signing party. Moreover, so long as the security of the private key is maintained by not disclosing it to others, the cryptographic algorithms used in conjunction with the digital signature protect against forgery.

Keeping these general principles of public key cryptography and digital signatures in mind, their implementation in the present invention may now be described. This implementation will be described with respect to a hard disk drive; however, it will be appreciated that the present invention is widely applicable to any block-level storage device such as CD-ROM drives, DVD drives or FLASH memory cards. In addition, this implementation will be described with respect to an ECC (elliptic curve cryptography) form of public key cryptography. It will be appreciated, however, that any suitable form of public key cryptography may be used such as the RSA algorithm. ECC cryptography has the useful feature that as the public key size is increased, the difficulty of deciphering the resulting encryption without the corresponding private key increases exponentially. In general, the computation complexity will also increase as the key size increases. ECC cryptography provides a convenient compromise between computational complexity and security.

In a public key cryptography system, each participant may receive the public key from another participant. Because these public keys are disseminated to other participants, a public key cryptography system needs some way to ensure that holders of public keys are authorized to possess them. As is known in the art, this assurance may be achieved through the use of digital certificates distributed by trusted third party known as the certifying authority. A holder of a public key will thus also possess a certificate. In the embodiments discussed herein, this certificate will contain a digital signature of the certifying authority to show that the holder of a public key is authorized to be in possession of it.

Turning now to FIG. 1, various stages in the authentication process and session key exchange between a host system 5, a hard disc storage engine 20, and a hard disc storage medium 25 are illustrated. Before host system 5 can access or write protected content to disc 25, host system 5 provides storage engine 20 a digital signature 10 from a certifying authority (not illustrated). As discussed previously, storage engine 20 verifies digital signature 10 with the corresponding public certifying authority key. Although host system 5 may carry a valid digital signature 10 from the certifying authority, certain events such as unauthorized access to protected content may lead to revocation of the rights afforded by digital signature 10. To allow for such revocation, disc 25 contains a revocation list 35 in a secure area 40 on disc 25. The revocation list may be stored on the disc during the storage media manufacturing process or updated dynamically through vendor unique commands in the field. Each participant such as storage engine 20 and host system 5 is assigned a unique ID number. Storage engine 20 checks revocation list to verify that the ID number for host system 5 is not on the list. Further details regarding the revocation process are provided in U.S. patent application Ser. No. 09/940,026, the contents of which are hereby incorporated by reference.

If host system 5 carries a valid digital signature 10 and is not identified on revocation list 35, storage engine 20 may proceed to generate a secure session key 60 using a random number generator 70. Note that because secure session key 60 thus results from a random number generation, it will be unique to each "session" during which host system 5 accesses secure content on disc 25. The duration of a session may be arbitrarily limited to extend just long enough that host system 5 may read or write a single block of secure content from disc 25. Alternatively, the session duration may be extended to cover the access to multiple files or as long as an implementor deems sufficiently secure. Each participant in a public key security system may have its own public and private key pair. To access secure content on disc 25, host system 5 provides not only digital signature 10 but also its public key 75. Using public key 75, storage engine encrypts secure session key 60 and transmits the encrypted secure session key to host system 5. Host system 5 may then use its private key 80 to decrypt the transmission to recover secure session key 60.

After host system 5 has been authenticated and has possession of secure session key 60, host system 5 may begin to write or read secure content. In contrast to prior art content security systems, secure blocks of digital content may be stored throughout a file system area 85 of disc 25. Each secure (encrypted) block stored within file system area 85 is associated with security data (often denoted as metadata) stored in a secure file area 40 of disc 25. The association or linkage between content and the corresponding metadata depends upon the file system used in host system 5. For example, the encrypted data and the metadata may have the same file name but have different extensions. In this case, a sample encrypted file "myfile.text" may be associated with the corresponding security keys in a metadata file "myfile.sec." An example of a file name security metadata linkage is the file allocation table (FAT) file system within MS-DOS uses. Rather than use a file name security data linkage, each data file in a file system may have an associated "stream." The stream is implicitly linked to the encrypted file as part of the file system architecture. The file system for Microsoft Windows (NTFS) supports streams for implementing the security data linkage in this fashion. Another file system supporting streams is UDF for optical media. Regardless of how a particular file system associates the security metadata to the encrypted content, security keys will be associated with each file. Because of the block-level implementation, host system 5 transmits to storage engine 20 requests for access to blocks, not files (as used herein, an "access" shall refer to both reading and writing secure content to disc 25). Thus, storage engine 20 does not "know" that a file is being requested, it receives only block requests. However, host system 5 will know the identity of a particular file, of course, that is the subject of a block request to storage engine 20. In turn, using the linkage just described, host system 5 may identify the corresponding block or blocks storing the security metadata in conjunction with a block request for content to storage engine 20.

For host system 5 to write secure content to disc 25, host system 5 encrypts the content and passes the encrypted content and the associated security key(s) to storage engine 20. Conversely, for host system 5 to read secure content from disc 25, storage engine 20 must read the associated security key(s) from disc 25 and transmit the encrypted content and the associated security key(s) to host system 5.

Figure 2:
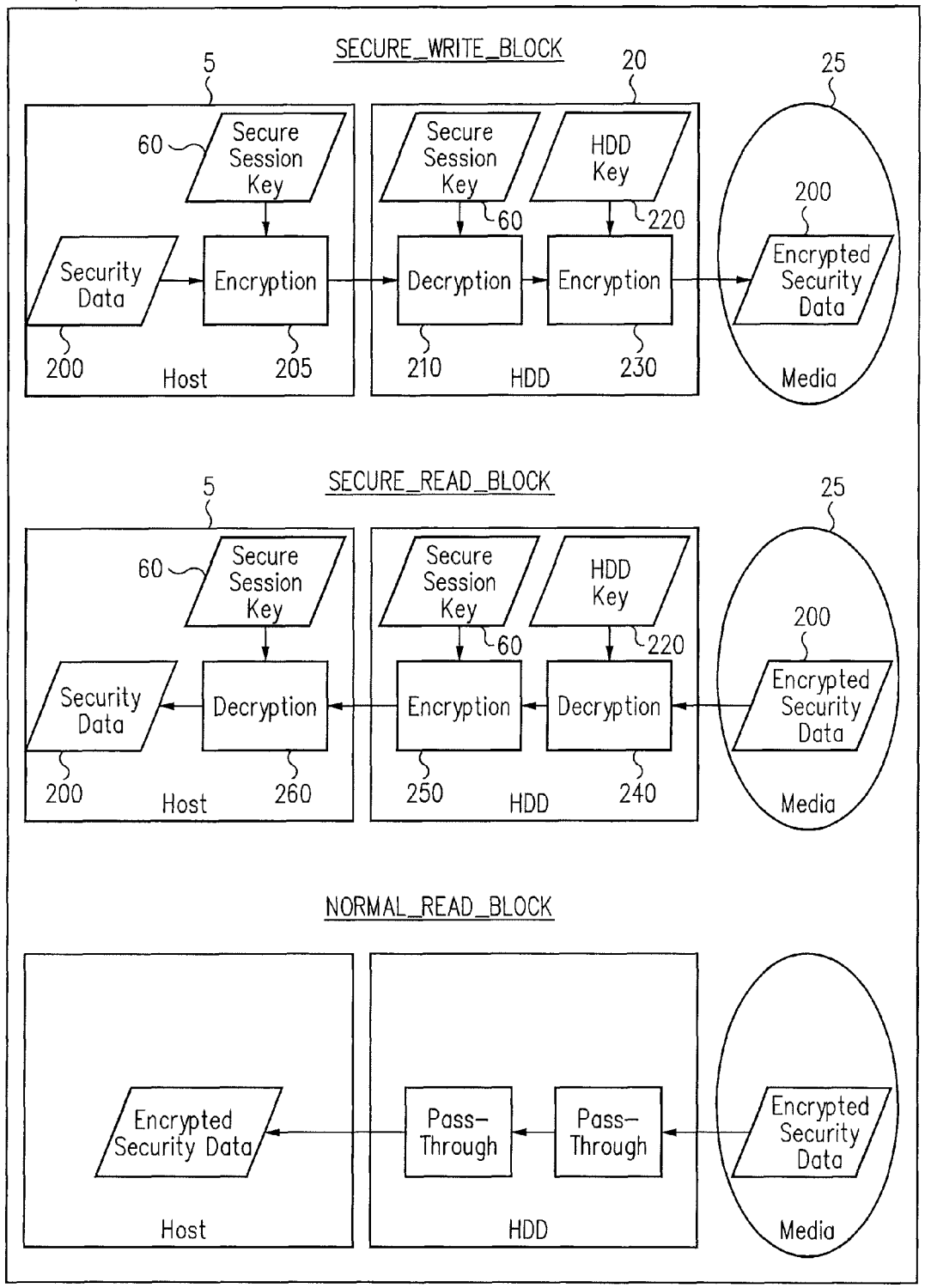
FIG. 2 is a block diagram for a host system and an associated block-level data storage device that illustrates a secure read process and a secure write process according to one embodiment of the invention.

The integration of these two processes (reading and writing secure content) may be summarized as seen in FIG. 2. Both storage engine 20 and host system 5 have their own public key/private key pairs as discussed above. A session key 60 may be generated by storage engine 20 and then encrypted using the public key 75 from host system 5 as shown in FIG. 1. However, it should be appreciated that a similar process may be used wherein an alternative session key is generated using the public key (not illustrated) from storage engine 20. Given that storage engine 20 is the passive participant in the sense that it is the host system 5 that will initiate requests to read and write secure content from disc 25, it follows that in response to the requests from host system 5, storage engine 20 would require host system 5 to verify it is authorized to access such content through the generation of secure session key 60 as described previously. In other words, if one participant initiates the need for a verification process, it is the "passive" participant that will generate the corresponding secure session key. Thus, the following discussion will be described with respect to the storage-engine-generated secure session key 60. However, it will be appreciated that the use of a host-system-generated secure session key is also within the scope of the present invention.

Referring again to FIG. 2, host system 5 may conduct conventional block-level reads and writes of digital content from/to disc 25 using storage engine 20 as is known in the art. In addition, however, host system 5 and storage engine 20 must modify their behavior to accommodate secure accesses. To provide such accommodation, a SECURE_WRITE_BLOCK command and a SECURE_READ_BLOCK command are added to the command specification for each device. These commands are only available to a host system 5 that has been authenticated using secure session key 60. For each command, host system 5 must be in possession of secure session key 60. In the present invention, secure session key 60 may be used to encrypt the security metadata (security key(s)) linked with protected (encrypted) digital content. As is the case with any conventional block-level storage device, storage engine 20 will also respond to non-secure block-level write and read commands from host system 5.

Each participant (host system 5 and storage engine 20) may have its own form of encryption. Double encryption is thus enabled such that in a write of secure content to disc 25, host system 5 encrypts the secure content and passes the encrypted secure content to storage engine 20. In turn, storage engine 20 may again encrypt the encrypted secure content received from host system 5 and write the doubly-encrypted secure content to disc 25. The particular form of encryption used by host system 5 and storage engine 20 is not important. However, note that the encryption key associated with the encryption method used by storage engine 20 is never revealed to host system 5, thereby adding a significant security improvement over conventional DRM methods.

During the execution of a SECURE_WRITE_BLOCK command, host system 5 will encrypt the content that will be written to disc 25 using whatever encryption method host system 5 finds suitable. The associated security metadata (the security key(s)) required to decrypt the resulting encrypted content is shown as security data 200 in FIG. 2. Using secure session key 60, security data 200 is encrypted in encryption block 205. Numerous encryption methods may be implemented in encryption block 205—what is important is that, regardless of the encryption algorithm implied by security data 200, storage engine 20 must be able to decrypt the resulting encrypted security data 200 using secure session key 60 in decryption block 210. Using its own encryption method as denoted by storage engine security key 220, storage engine 20 then re-encrypts security data 200 in encryption block 230 and writes re-encrypted security data 200 to disc 25. In the same fashion, storage engine 20 could also re-encrypt the associated encrypted content being received from host system 5. Note that the associated singly or doubly-encrypted content is not illustrated but would also be processed and written to disc 25 at this time as will be further explained herein.

The execution of a SECURE_READ_BLOCK command occurs analogously as illustrated in FIG. 2. Encrypted security data 200 from disc 25 is decrypted by a decryption block 240 using storage engine security key 220. In turn, the decrypted security data 200 is re-encrypted in an encryption block 250 using secure session key 60. Host system 5 uses a decryption block 260 and secure session key 60 to strip the secure-session-key-induced encryption from the encrypted security data 200 received from storage engine 20. Assuming that the content corresponding to security data 200 has been doubly encrypted, storage engine 20 will remove the layer of encryption it provided to this content. However, the host system encryption of this protected content remains. After decrypting the corresponding security data 200 as just described, host system 5 may now remove this final layer of encryption and retrieve the specified content. The various encryption and decryption blocks described herein with respect to the figures may be implemented using dedicated ASIC circuitry, firmware, or software as known in the art.

Those of ordinary skill in the art will appreciate that the encryption of security data 200 discussed with respect to FIG. 2 is independent of the underlying content encryption schemes implemented in host system 5 and storage engine 20. In one embodiment of the invention, the content encryption (as opposed to the encryption of security metadata) provided by host system 5 may be the only encryption applied to the content to be secured. In other words, in such an embodiment, although storage engine 20 re-encrypts the encrypted security data 200 received from host system 5, it does not apply an analogous re-encryption to the associated encrypted content.

Figure 3:
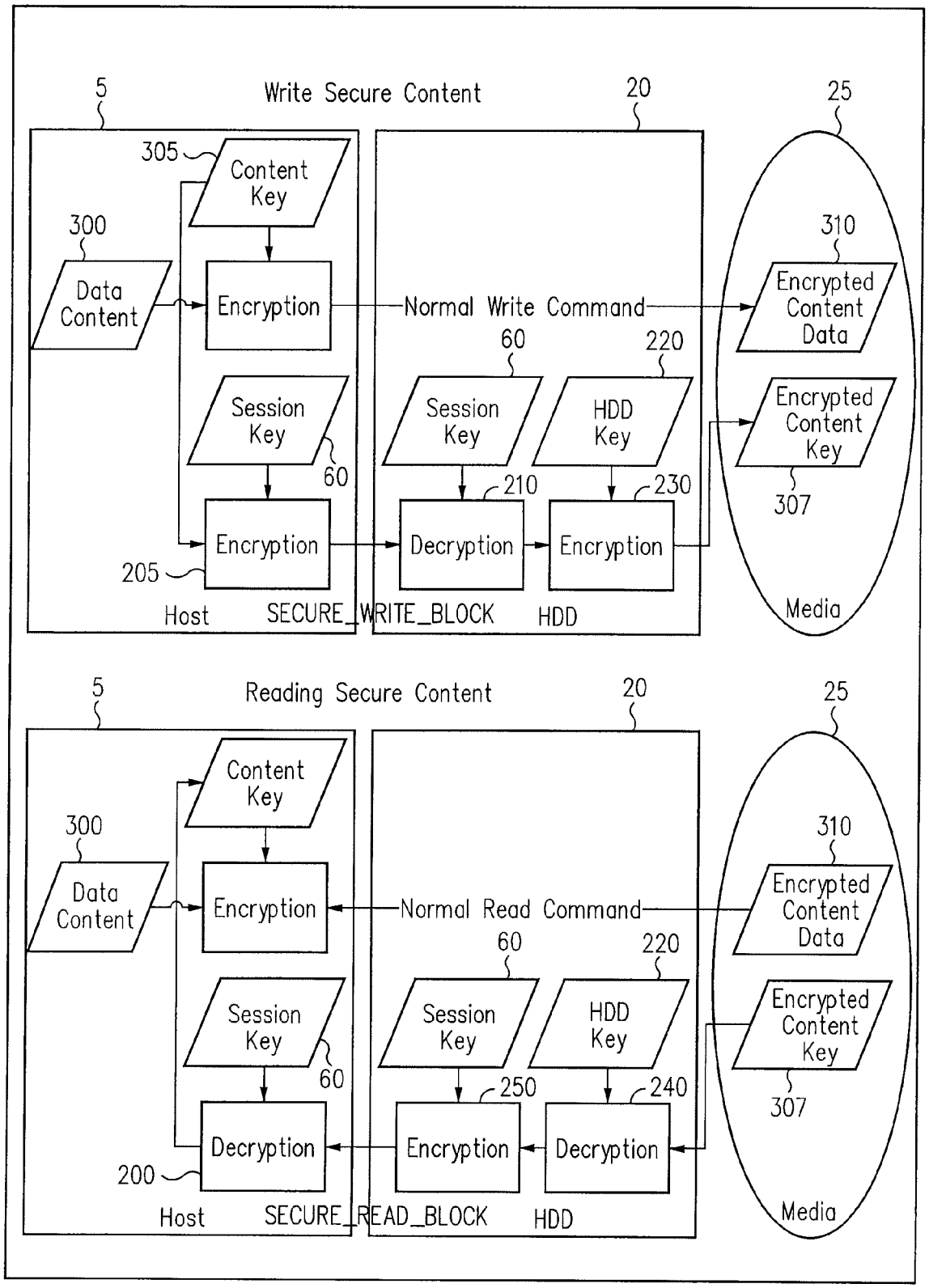
FIG. 3 is a block diagram for a host system and an associated block-level data storage engine that illustrates a secure read process and a secure write process wherein the data storage engine does not encrypt the digital content according to one embodiment of the invention.

FIG. 3 illustrates the operation of a SECURE_WRITE_BLOCK command and a SECURE_READ_BLOCK command for a storage engine 20 that does not apply any further encryption to the encrypted content received from host system 5. To perform a write of a secure block of data to disc 25, host system 5 encrypts data 300 using security data 305 (because this encryption is applied to the content as opposed to encrypting the encryption key itself, this security metadata may also be denoted as a "content key"). Storage engine 20 writes the resulting encrypted content 310 to disc 25 using a conventional block write command process. The corresponding content key 305 is encrypted/decrypted using secure session key 60 and then re-encrypted using a storage engine security key 220 according to a SECURE_WRITE_BLOCK command as described with respect to FIG. 2. The resulting encrypted content key 305 is then written to disc 25. Similarly, in a read of encrypted content 300 from disc 25, storage engine 20 responds to a conventional block-level read command and provides encrypted content 310 to host system 5. Pursuant to a SECURE_READ_BLOCK command operation as described with respect to FIG. 2, encrypted content key 307 is decrypted using storage engine key 220 and then encrypted with secure session key 60 within storage engine 20. After recovering content key 305 by decryption with secure session key 60, host system 5 may now decrypt encrypted content 310 to recover content 300.

As described previously, the linkage between an encrypted file and the security key(s) in the associated metadata depends upon the file system implemented in host system. In some cases the security data may be stored in a separate file as described previously with respect to a FAT file system or the security data may be stored within a stream as discussed with respect to an NTFS file system. Host system 5 will have a file system driver (not illustrated) as is known in the art that converts file requests to the low-level block requests that are passed to storage engine 20. A particular file may be marked as secure by an option passed to the file system driver. This option may be as simple as a single binary flag which is asserted if the file is to be denoted as secure. Higher-level applications within host system 5 would be responsible for the verification and encryption steps described previously. To write secure content to disc 25, the file system driver in host system 5 would follow conventional methods except that the writing of the accompanying content key is accomplished through the SECURE_WRITE_BLOCK command (as determined by the received option) rather than through a normal write command. Similarly, a secure read by the host application may occur through a secure file access option that is passed to the file system driver by higher level applications responsible for the verification and encryption steps described previously. This secure file option may again be as simple as a single binary flag that is asserted if the file to be read is to be denoted as secure. In response to the assertion of the secure file option, the file system driver uses a SECURE_READ_BLOCK command rather than a normal read command when accessing the content key associated with the secure file.

Figure 4:
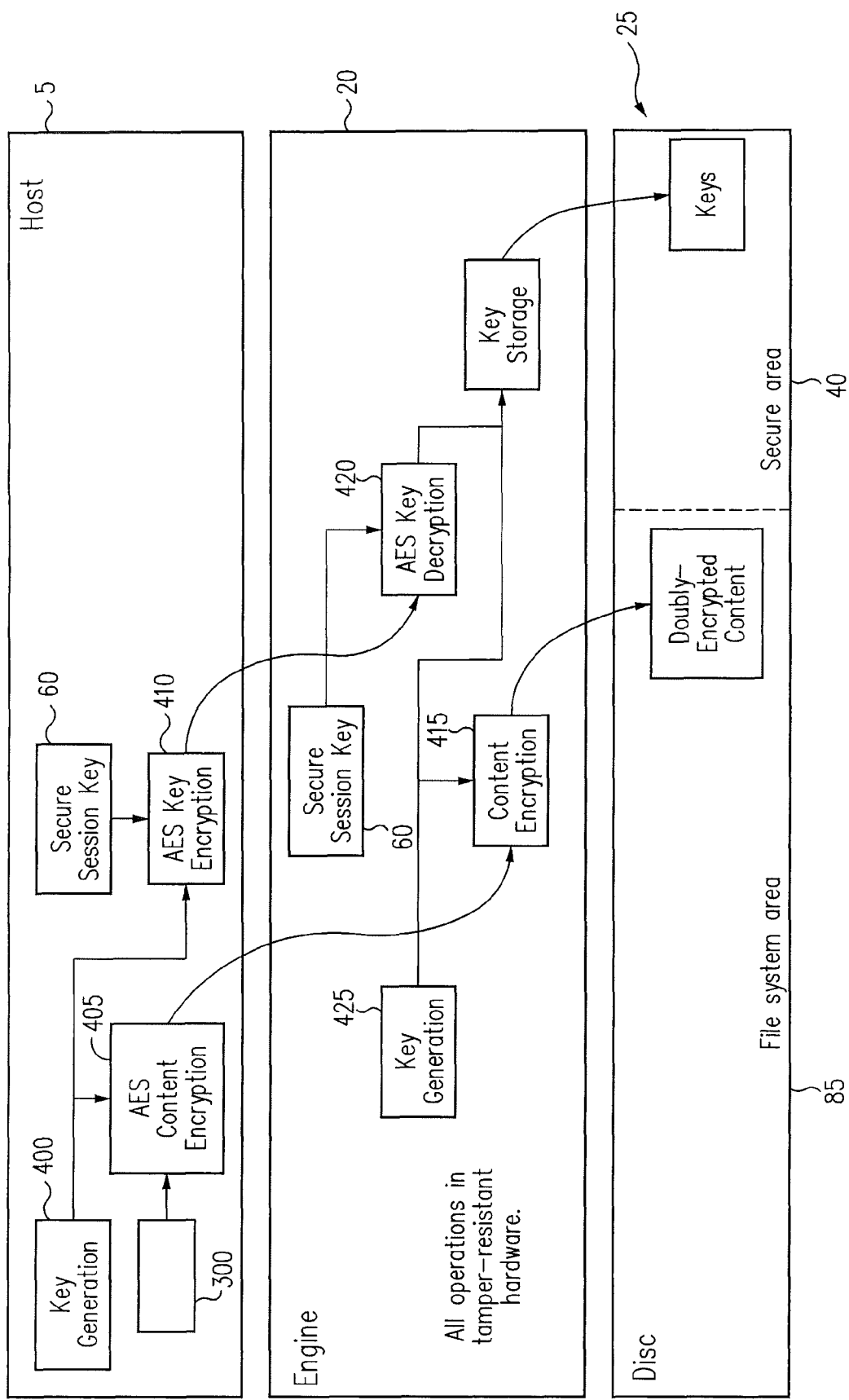
FIG. 4 is a block diagram for a host system and an associated block-level data storage engine that illustrates a secure write process wherein the host system encrypts digital content according to an AES algorithm and wherein the storage device further encrypts the digital content according to a DES algorithm.

As discussed with respect to FIGS. 2 and 3, the present invention is independent of the type of encryption applied to the data content. A particular form of data encryption, however, will now be described with respect to FIGS. 4 and 5. FIG. 4 illustrates steps in the execution of a SECURE_WRITE_BLOCK command in which host system 5 encrypts content 300 using an Advanced Encryption Standard (AES) algorithm. AES key generation module 400 generates the required AES key so that content 300 may be encrypted in AES encryption block 405. A secure session key 60 is generated by storage engine 20 as described with respect to FIGS. 1 and 2. Using secure session key 60, host system scrambles the AES key in AES key encryption block 410. Storage engine 20 receives the AES-encrypted content from host system 5 and performs an additional encryption on this encrypted content using a Data Encryption Standard (DES) algorithm in encryption block 415. This encryption may occur using single, double, or triple DES encryption as described in U.S. patent application Ser. No. 09/583,452, entitled "Method of Decrypting Data Stored on a Storage Device Using an Embedded Encryption/Decryption Means," filed May 30, 2000, the contents of which are hereby incorporated by reference. The corresponding DES key or keys are generated in DES key generation module 425. Using secure session key 60, data storage engine decrypts the AES key in AES key decryption block 420. The AES key is then DES-encrypted and the DES key(s) and the encrypted AES key are then stored in secure area 40 of disc 25. The associated doubly-encrypted data content is stored in file system area 85 of disc 25.

Figure 5:
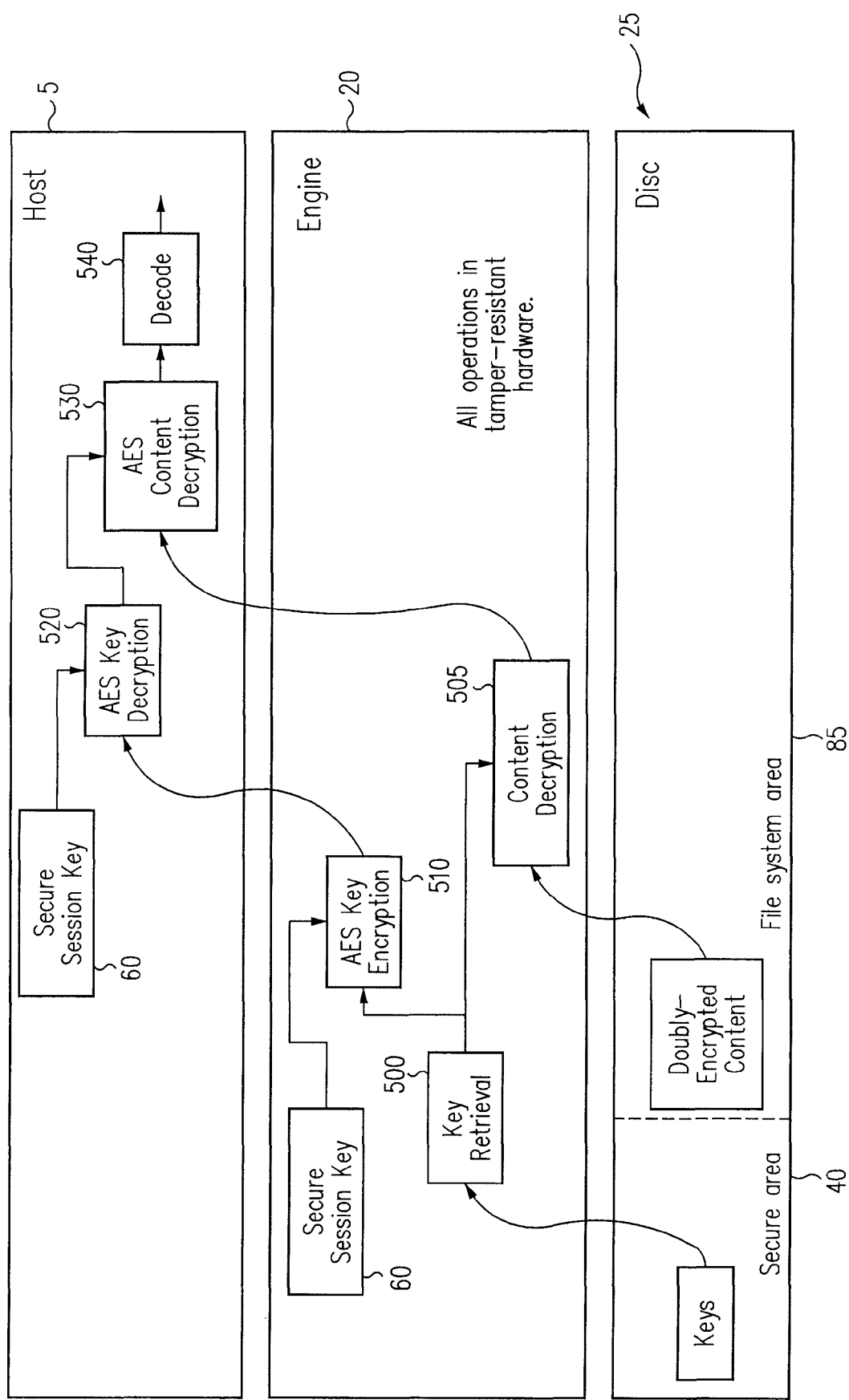
FIG. 5 is a block diagram for the host system and the associated block-level data storage engine of FIG. 4 that illustrates a secure read process.

The analogous steps in the execution of a SECURE_READ_BLOCK command are shown in FIG. 5. Storage engine 20 retrieves the encrypted AES and DES keys from disc 25 in key retrieval block 500. Using the retrieved DES key(s), the doubly-encrypted content has the DES encryption removed in content decryption block 505. The resulting AES-encrypted content is then transmitted to host system 5. Similarly, the retrieved encrypted AES key is DES-decrypted and then encrypted with secure session key 60 in AES key encryption block 510 and transmitted to host system 5. Host system 5 may now decrypt the AES key in AES key decryption block 520 using secure session key 60. The AES-encrypted content may then be decrypted in AES content decryption block 530 to provide the original content 540.

Note the advantages of this double encryption in that the DES key(s) never leave storage engine 20. Thus, even if an unauthorized user of host system 5 is able to read the doubly-encrypted content, the content will remain secure because the unauthorized user has no access to the DES key(s). Moreover, as described further in the '452 application, the DES key(s) may be used in combination with a media identifier (ID) unique to each disc 25. For example, a 128-bit random number may be associated with each disc. This media ID may be stored on a disc 25 if it is removable or stored in a non-volatile memory of storage engine 20 if the media is fixed. The DES encryption applied by storage engine 20 is a function of the media ID. In this fashion, should the encrypted content be copied without proper authorization to another media, an unreadable file results. As a result, the content is "bound" to the media.

Having provided an overview of the present invention with respect to providing content protection for a block-level storage engine, some features may now be described in greater detail. For example, to control the ability to copy content, copy control flags may be included within the security metadata linked to the content. A number of flags may be used such as: a "Copy Freely" flag indicating that no copy control applies; a "Copy Never" flag indicating that no copies may be made, or a "Copy N Times" flag that indicates the number of copies that may be made of the content. A host system 5 will act as the source in that it reacts to a copy request by reading the security data from disc 25. This source host system 5 then checks the copy flags for copy rights. With respect to a "Copy N Times" flag, host system 5 decrements the copy N time flag as required and updates the security metadata accordingly on disc 25 using the SECURE_WRITE_BLOCK command discussed above.

Another feature host system 5 may control is the ability to "lock" or "unlock" content on disc 25. This locking may be applied to any block, range of blocks, or partitions on disc 25. Numerous methods may be used to indicate a block as being locked. For example, a block may be marked as inaccessible to host system 5 through a bit or bits written into the header of the block. In response to a read request from an unauthorized host system 5, storage engine 20 would respond to the presence of these marking bits in the headers of locked blocks by returning an error code. Alternatively, storage engine 20 may write a list of locked blocks to host-inaccessible secure area 40 (FIG. 1) on disc 25. Storage engine 20 would be configured to consult the locked block list for each read operation to determine whether a block-to-be-read is locked. Should the block be locked, storage engine 20 would return an error message. As another example, storage engine 20 may store locked blocks on disc 25 in encrypted form. The corresponding encryption would not be stored locally. Instead, the encryption key would be stored in an external unlock database. The appropriate encryption keys could be written to the external unlock database prior, during or after the locked blocks are written to disc 25.

To perform an unlock operation, a transaction must take place between an authenticated and authorized host system 5 and a storage engine 20. A typical scenario would be a host system 5 comprising an Internet-based server. The server would possess a certificate having a digital signature as described with respect to FIG. 1. After verification of the digital signature and checking any applicable revocation lists, storage engine 20 receives unlocking data from the server. The unlocking data includes the block addresses of the locked content on disc 25 as well as some form of unlocking key. The nature of the unlocking key depends upon the way in which the blocks holding the content have been blocked. For example, if the blocks have been blocked by the addition of bits to their headers, the unlock key may be as simple as a flag. In response to this flag, storage engine 20 would ignore or cancel the header indications. Alternatively, if the blocks are locked by being encrypted, the unlock key may comprise the appropriate decryption key. For each unlocked block, storage engine 20 modifies the block itself, a separate locked block list, or the appropriate data structure to unlock the content.

Note that having host system 5 check for copy rights and update the copy counter may make the system vulnerable to attack, in that an unauthorized user or "hacker" may reprogram the host to permit additional unauthorized copies. Thus, in alternative embodiments discussed further herein, storage engine 20 will control these operations through the addition of a "security repository" to disc 25. Storage engine 20 controls the location, format, and security for the security repository. Host system 5 does not have direct access to the security repository by normal block access means. Instead, storage engine 20 provides access to the security repository only to authenticated and authorized hosts as discussed with respect to FIG. 1. In addition, however, host system 5 may access the security repository only through a special set of commands as will be described herein. Moreover, security repository information applies to file system objects rather than to block addresses. As is known in the art, file system objects includes both files and directories. Thus, with respect to the security repository, storage engine 20 must have some knowledge of the file system used in host system 5. Such an embodiment of the invention stands in contrast to previously-discussed embodiments in which storage engine 20 may have no knowledge of the file system whatsoever. Thus, the present invention may be classified into two main embodiments. In the first embodiment, the security data on disc 25 is block level, i.e., decryption data for a specific block or range of blocks corresponding to protected content. In the second embodiment, the security data on disc 25 is file system level, i.e., decryption data for specific file system objects stored on disc 25.

Note the differences between these two embodiments. In the first embodiment, host system 5 maintains the security linkage. For example, suppose this linkage occurs through the file name and the host system user wishes to write a file to disc 25 (for discussion purposes, this file will be denoted as "myfile.txt"). The corresponding security metadata is thus associated through the file name, for example, as "myfile.sec." In general, the manner in which the security linkage is performed depends upon the file system implemented in host system 5. As is known in the art, host system 5 includes a low-level block driver that will determine the necessary number of blocks that will need to be written to on disc 25 to store myfile.txt. Arbitrarily, these blocks may be denoted to have block addresses 1 through 10 on disc 25. After encrypting myfile.txt with the security data, host system 5 transmits the encrypted content through block write requests to storage engine 20 such that the encrypted content is written to block addresses 1 through 10. In conjunction with writing to these block addresses, host system 5 "knows" (through its file system linkage) that the security data in myfile.sec must also be written to disc 25. This security data may be written through the use of an appropriate command such as the SECURE_WRITE_BLOCK command described above. Storage engine 20 does not "know" it is writing security metadata that must be linked to block addresses 1 through 10, it just writes this data to secure area 40 as commanded by host system 5.

However, in the second embodiment, storage engine 20 will have knowledge that the security data corresponds to a certain file system object. Following the above example, suppose host system 5 now wants to read "myfile.txt" from disc 25. In this second embodiment, a SECURE_READ_FILE_SYTEM_OBJECT command would be used that is analogous to the SECURE_READ_BLOCK command except that the SECURE_READ_FILE_SYSTEM_OBJECT command corresponds to a set of security metadata that applies to a file system object. The same authentication and encryption processes apply, however, as described with respect to FIGS. 1 through 3. Because storage engine 20 now controls the security metadata, it is the participant that can check, for example, a play counter (described further below) to determine whether host system 5 can access the corresponding file system object. As such the DRM functionality and security is greatly enhanced.

The linkage between security repository data and the protected content on disc 25 involves two "pointers." The first pointer comprises a unique identifier for the security repository to provide the linkage to file system objects existing within the native file system on host system 5. For example, storage engine 20 may create a simple identifier whenever it creates a new security repository. From the perspective of host system 5, this identifier is stored as determined by its file system's security metadata linkage technique. For example, should the file system use streams, the identifier would be stored in a stream associated with the corresponding file system object needing content protection. Alternatively, if the host's file system uses file name conventions to provide the security data linkage, the identifier would be stored in a file whose name depends upon the corresponding file system object. The second pointer points from the security repository back to the file system object. For example, this second pointer may use a pathname of the file system object and is stored as part of the security repository data. Thus, with respect to the two pointers just discussed, they are the opposites of each other in that the first pointer identifies the security repository data given the file system object identity whereas the second pointer identifies the file system object given its security repository data. The security repository must, of course, also provide the decryption key (which may be denoted as a "content key") to decrypt the associated file system object. In addition, the security repository may hold ancillary metadata such as the copy flags discussed previously (copy never, copy freely, copy N times), a copy N counter, a play N counter, a locked/unlocked flag, application dependent secure metadata, and digital rights management (DRM) extension information as will be described further herein.

To interact with the security repository, host system 5 may use the following commands. As is the case with the SECURE_WRITE_BLOCK and SECURE_READ_BLOCK commands discussed previously, the command name and format is unimportant and may be varied in alternate embodiments. What is important is that the host system 5 be configured to interact with the security repository on a file system object level rather than the block level it uses to access the encrypted content on disc 25. Moreover, the following commands are only used after the authentication and verification procedure discussed with respect to FIG. 1.

If host system 5 is to write secure content to disc 25, disc space for the corresponding security repository metadata set needs to be allocated. Thus, after authentication and verification, host system 5 may issue a CREATE_NEW_CK_DATA_SET command to storage engine 20 so as to allocate space within secure area 40 on disc 25 for a security repository metadata set. In addition, storage engine 20 may initialize this metadata set with default values (or with customized values) at this time and return an identifier to host system 5 for the newly-created metadata set. Conversely, if host system 5 is deleting secure content from disc 25, it may issue a DELETE_CK_DATA_SET command to storage engine 20 that identifies the metadata set to be deleted using the same identifier. In response, storage engine 20 would delete the identified metadata set from the security repository. Host system 5 may issue a SET_PLAY_KEY command to storage engine 20 so that the appropriate decryption key(s) for the encrypted file system object are written into the corresponding metadata set in the security repository. Conversely, host system 5 may issue a GET_PLAY_KEY command to obtain the appropriate decryption key(s) from the metadata set in the security repository so that host system 5 may decrypt the corresponding file system object received from storage engine 20. In response to a SET_METADATA command from host system 5, storage engine 20 will check that the host is authorized to set the requested metadata and, subject to confirmation of the authorization, set the requested metadata in the security repository.

By implementing a security repository in secure area 40 of disc 25 as just discussed, a number of DRM functions are enhanced. For example, by implementing such a security repository, storage engine 20 may now manage the unlocking of encrypted content. Each encrypted file system object on disc 20 is associated with its own metadata set in the security repository. An indication (such as an LOCKED/UNLOCKED state bit) of whether the corresponding file system object is locked or unlocked may be part of each metadata set. If a file system object is indicated as being in the locked state, storage engine 20 will not respond to a key request such as the GET_PLAY_KEY command discussed previously. Because host system 5 cannot then obtain the decryption key(s), the file system object remains inaccessible. To unlock such a file system object, host system 5 may issue an UNLOCK command to storage engine 20. This command may only be executed by an authenticated and authorized host system 5 (for example, an Internet server). In response to receiving such a command, storage engine 20 denotes the corresponding file system object as unlocked by, for example, changing the state of a LOCKED/UNLOCKED state bit. Subsequent operations such as a GET_PLAY_KEY operation accessing the unlocked file system object would then be allowed.

Another DRM function that is enhanced would be a counted play operation. In this operation, the content provider limits the number of plays a user may have of certain content. For example, should host system 5 issue a GET_PLAY_KEY command, storage engine 20 may check the corresponding set of metadata in the security repository to determine the play status (such as play freely, play never, or play N times). In the case of a play N times indication, storage engine 20 would consult the corresponding play counter in the metadata set to determine whether the file system object has any play counts left. If play counts are available, storage engine 20 decrements the play counter and returns the decryption key(s) to host system 5. Should there be no play counts left, storage engine 20 may return an error message instead, thereby preventing host system 5 from further access to the corresponding file system object. In addition, storage engine 20 may set a LOCKED indication for the file system object, thereby providing a self-locking mode after the play counter decrements to zero. Alternatively, storage engine 20 may overwrite the decryption key(s) with random values to provide a "self-destruct" mode in response to the play counter decrementing to zero.

The DRM copy function is also enhanced. Because the corresponding metadata set in the security repository is required to access a file system object, merely copying the file system object from one disc 25 to another will not provide host access. In addition, because storage engine 20 controls access to the security repository, it may directly transfer the metadata set from one disc 25 to another, thereby eliminating host system 5 as a "middleman" in a copy operation. Such a process may occur as follows. A first host system reads an encrypted file system object from a first disc 25 (through an associated first storage engine) and transmits the encrypted file system object to second host system to be written to a second disc via an associated second storage engine. Because of the encryption, the second host system cannot yet access the content within the encrypted file system object. The first and second storage engines may then establish a secure channel wherein the second storage engine takes the role of host system 5 in FIG. 1 such that each storage engine uses the first and second host systems as data passing facilitators. The first host system may then issue a GET_CK_DATA_SET command to the first storage engine. In response to this command, the first storage engine will first verify that the copy counter is greater than zero and, if so, decrement the copy counter. A copy or analog of the corresponding set of metadata is then returned to the first host system. Rather than issue an exact copy, an analogous copy of the metadata set could differ by having the copy counter set to zero such that the second encrypted file system object will not have copy privileges. The copy or analog set of metadata may be encrypted by the current secure session key 60 as discussed with respect to FIG. 1 before the encrypted set of metadata is sent to the second host system. The second host could then issue a SET_CK_DATA_SET command to the second storage engine. In response to such a command, the second storage engine may decrypt the encrypted set of metadata and store it in the security repository on the second disc. The second host system would provide the appropriate linkages between the file system object and the set of metadata stored on the second disc. This linkage may differ from that used in the first host system, depending upon the respective file system used in each host.

Additional DRM functions may also be enhanced. For example, a check in/check out function may be implemented with respect to the formation of temporary copies of a files system object such as a copy made to a volatile storage medium such as flash memory. A check-out count may be stored within the corresponding set of metadata in the security repository. For each temporary copy, the storage engine would decrement the check-out count accordingly. The storage engine 20 would reject requests for additional temporary copies when the check-out count is zero. When a temporary copy is checked back in by host system 5, storage engine 20 would increment the check-out count.

Consider the advantages provided by implementing the security repository described herein. Much effort has already been provided in conventional host file systems to convert a file system object request and convert the file system object request into the corresponding block level requests. Conventional block-level drivers within the host have large bandwidths to quickly move block level content to and from an associated block-level storage engine and its associated disc. This capability is preserved in a storage repository embodiment. However, storage engine 20 now controls the location and format of the security metadata sets. Moreover, because the metadata sets each correspond to a file system object rather than a block or range of blocks, the granularity of operations such as an unlock is much higher.

In the embodiments described above, the storage engine 20 is relatively "dumb" in that it has no ownership of the file system used to with respect to the encrypted content on disc 25. For example, although storage engine 20 may have file-system-object-level access to security metadata in embodiments incorporating a security repository, storage engine 20 has no knowledge regarding the physical blocks a given file system object may occupy on disc 25. This knowledge is retained by host system 5, which must perform the translation of a file system object request into the corresponding block level request. In contrast to such an approach, U.S. patent application Ser. No. 09/539,841, entitled "File System Management Embedded in a Storage Device," filed Mar. 31, 2000, now U.S. Pat. No. 6,823,398, discloses a storage device that responds to file system object requests rather than block-level requests. Such a storage device controls where content is stored on the storage medium as well as the security data linkage. Similarly, a file system management system may be embedded within storage engine 20 such that a "hybrid file system management" results. In a hybrid file system embodiment of the present invention, storage engine 20 implements a file system for encrypted file system objects. At the same time, host system 5 maintains its own file system for non-secure file system objects. In hybrid file system embodiments, storage engine 20 will store file system objects and the associated security metadata in a manner of its own choosing. In this fashion, storage engine 20 may maintain tight control over its ability to link the security metadata with the encrypted file system objects. As discussed previously, there are a number of ways in which security metadata may be linked with encrypted files such as through streams. Regardless of how storage engine 20 implements this linkage in a hybrid file system embodiment, storage engine 20 should maintain a set of non-security-related metadata for each encrypted file system object such the file system object name, the file system object size, the physical blocks occupied by the file system object, attributes associated with the file system object such as having a read-only status, and dates and times for file system object creation and modification.

Figure 6:
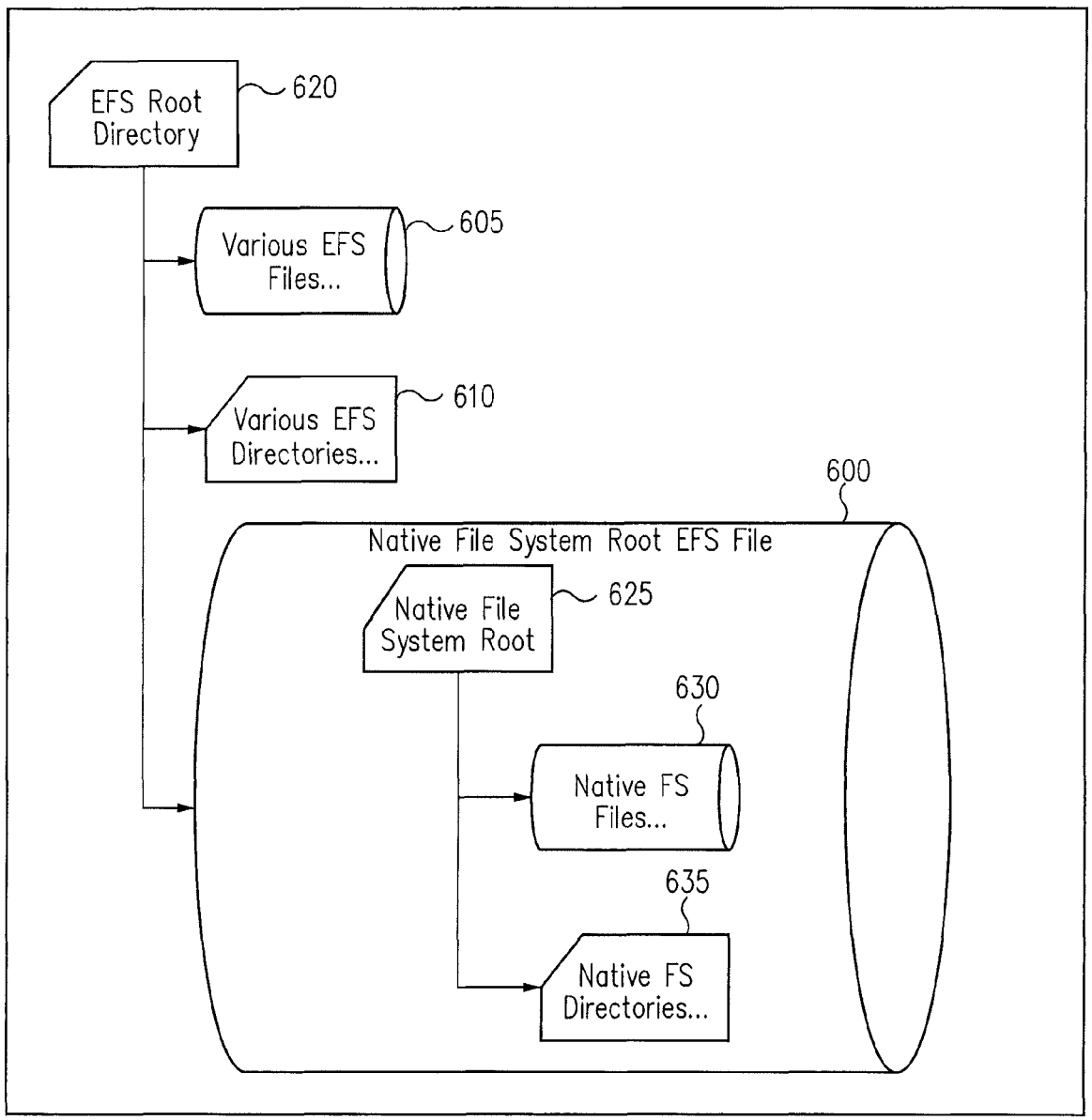
FIG. 6 illustrates the relationship between encrypted file system objects and non-secure file system objects with respect to a hybrid file system implemented within a storage engine according to one embodiment of the invention.

As seen in FIG. 6, from the perspective of the storage engine implementing a hybrid file system, non-secure files for which host system 5 maintains control and responsibility are contained within a native file system root file 600 within the file system implemented by the storage engine 20. The size of root file 600 depends upon the desired balance between storage space dedicated to secure vs. non-secure content. From the perspective of host system 5, root file 600 represents storage defined by logical block addresses (LBAs) that are accessed in a conventional block-level fashion. For example, host system may wish to store a sample file "myfile.txt" and commands storage engine to write the corresponding content to LBAs 0 through 10 on storage medium 25. Storage engine 20 translates the block-level requests to addresses within root file 600 according to its own file system. The storage-engine-implemented file system is denoted as the embedded file system (EFS). Encrypted file system objects such as files 605 and directories 610 are part of the EFS root directory 620. Native file system root file 600 includes its own native file system root directory 625, native files 630, and native file directories 635.

Implementation of the hybrid file system illustrated in FIG. 6 may be made independent of changes to the native file system implemented in host system 5. In such an embodiment, storage engine 20 would translate block-level commands received from host system 5 into the corresponding file operations within native file system root file 600. Advantageously, this independence allows storage engine 20 to place native file system blocks on disc 25 in a manner of its own choosing. In addition, DRM functions such as unlock are enhanced. For example, unlocks may be performed on files or directories, no matter how the content is arranged on disc 25. Decryption key(s) for encrypted file system objects may be stored in a manner that is not visible to the native file system. The ability to access these keys would be limited to authorized and authenticated hosts as discussed with respect to FIG. 1. In addition, a hybrid file system implementation provides compatibility for storage engines 20 that must work within a legacy block-based operating system environment.

The above-described embodiments of the present invention are merely meant to be illustrative and not limiting. It will thus be obvious to those skilled in the art that various changes and modifications may be made without departing from this invention in its broader aspects. The appended claims encompass all such changes and modifications as fall within the true spirit and scope of this invention

What is claimed is:

1. A block-level storage device, comprising:
a storage medium; and
a storage engine, the storage engine being configured to generate a secure session key and to receive a block of encrypted content and its corresponding encrypted content key from a host system, wherein the content key has been encrypted by the host system using the secure session key, the storage engine being further configured to decrypt the encrypted content key using the secure session key and to encrypt the decrypted content key with a first storage engine encryption key and to write the storage-engine-encrypted content key to the storage medium.

2. The block-level storage device of claim 1, wherein the storage engine is further configured to generate the secure session key in response to verifying the authenticity of a certifying authority's digital signature provided by the host system.

3. The block-level storage device of claim 2, wherein the storage engine is further configured to encrypt the secure session key using a public key provided by the host system such that the host system can recover the secure session key only by decrypting the encrypted secure session key using the private key corresponding to the public key.

4. The block-level storage device of claim 3, wherein the storage engine is further configured to re-encrypt the block of encrypted content using at least a second storage engine encryption key.

5. The block-level storage device of claim 4, wherein the second storage engine encryption key comprises a Data Encryption Standard (DES) key.

6. The block-level storage device of claim 5, wherein the DES key comprises a triple DES key.

7. The block-level storage device of claim 1, wherein the storage engine is a hard disc storage engine and wherein the storage media is a hard disc.

8. The block-level storage device of claim 7, wherein the storage media is a removable hard disc.

9. The block-level storage device of claim 3, wherein the public key and the private key are elliptic curve cryptography keys.

10. The block-level storage device of claim 1, wherein the storage engine includes a random number generator for generating the secure session key.

11. A method of writing to a block-level storage device from a host system having a public key and a corresponding private key, comprising:
encrypting a secure session key using the public key;
recovering the secure session key from the encrypted secure session key using the corresponding private key;
encrypting content according to a content key and commanding the block-level storage device to write the encrypted content to host-system-determined block addresses;
encrypting the content key using the secure session key and transmitting the encrypted content key to the block-level storage device;
in the block-level storage device, decrypting the encrypted content key using the secure session key;
in the block-level storage device, encrypting the decrypted content key with a storage device key; and
writing the storage-device-encrypted content key to a host-system-determined block address.

12. The method of claim 11, wherein the content comprises a file system object, the method further comprising:
in the block-level storage device, encrypting the decrypted content key with a storage device key, and
writing the storage-device-encrypted content key to a storage-device-determined block address.

13. A block-level storage device, comprising:
a storage medium; and
a storage engine, the storage engine being configured to respond to block-level non-secure content requests, block-level secure content requests, and block-level security metadata requests from a host system, the storage engine being further configured to, in response to a security metadata request, generate a secure session key and to receive an encrypted content key from the host system, wherein the content key has been encrypted by the host system using the secure session key, the storage engine being further configured to decrypt the encrypted content key using the secure session key and to encrypt the decrypted content key with a first storage engine encryption key and to write the storage-engine-encrypted content key to the storage medium.

14. The block-level storage device of claim 13, wherein the storage engine includes a random number generator for generating the secure session key.

15. The block-level storage device of claim 13, wherein the storage engine is configured to receive a public key from the host system and to encrypt the secure session key with the public key and to send the encrypted secure session key to the host system, whereby the host system may recover the secure session key only through the use of the host system's corresponding private key.

* * * * *